United States Patent
Narbonne et al.

(10) Patent No.: US 10,840,494 B2
(45) Date of Patent: Nov. 17, 2020

(54) COMPENSATION SYSTEM FOR SWELLING OF ELECTROCHEMICAL CELLS

(71) Applicant: SAFT, Bagnolet (FR)

(72) Inventors: Alexandre Narbonne, Blanquefort (FR); Jérôme Calmejane, Saint Germain du Puch (FR); Marc Chesnais, St Medard en Jalles (FR)

(73) Assignee: SAFT, Bagnolet (FR)

( * ) Notice: Subject to any disclaimer, the term of this patent is extended or adjusted under 35 U.S.C. 154(b) by 165 days.

(21) Appl. No.: 15/435,514

(22) Filed: Feb. 17, 2017

(65) Prior Publication Data
US 2017/0244088 A1   Aug. 24, 2017

(30) Foreign Application Priority Data
Feb. 18, 2016   (FR) ..................................... 16 51299

(51) Int. Cl.
| | | |
|---|---|---|
| *H01M 2/16* | (2006.01) | |
| *H01M 10/0525* | (2010.01) | |
| *H01M 10/04* | (2006.01) | |
| *H01M 2/10* | (2006.01) | |
| *H01M 10/058* | (2010.01) | |

(52) U.S. Cl.
CPC ....... *H01M 2/1653* (2013.01); *H01M 2/1016* (2013.01); *H01M 10/0481* (2013.01); *H01M 10/0525* (2013.01); *H01M 10/058* (2013.01)

(58) Field of Classification Search
CPC ......... H01M 10/0481; H01M 10/0525; H01M 10/058; H01M 2/1016; H01M 2/1653
See application file for complete search history.

(56) References Cited

U.S. PATENT DOCUMENTS

| | | |
|---|---|---|
| 2005/0042511 A1 | 2/2005 | Kaneta |
| 2007/0259261 A1 | 11/2007 | Rejman et al. |
| 2009/0061299 A1* | 3/2009 | Uchida ............... H01M 2/1077 429/156 |
| 2010/0136404 A1 | 6/2010 | Hermann et al. |
| 2011/0064983 A1 | 3/2011 | Yokoyama et al. |

(Continued)

FOREIGN PATENT DOCUMENTS

| | | |
|---|---|---|
| CN | 201038203 Y | 3/2008 |
| DE | 197 21 348 A1 | 11/1998 |

(Continued)

OTHER PUBLICATIONS

Communication dated Mar. 22, 2017 from the European Patent Office in counterpart Application No. 17155548.5.

(Continued)

*Primary Examiner* — Lingwen R Zeng
(74) *Attorney, Agent, or Firm* — Sughrue Mion, PLLC

(57) ABSTRACT

The invention resolves the problem of swelling of sealing electrochemical cells of prismatic format when they are assembled side by side in a grouping box by proposing a battery comprising at least two electrochemical cells (1*a*, 1*b*) of prismatic format, wherein the electrochemical cells are separated by a rigid wedge (2) having a hardness greater than or equal to 90 Shore A according to the standard ASTM D 2240 and by a flexible wedge (3) having a hardness of up to 60 Shore A according to the standard ASTM D 2240, the rigid wedge and the flexible wedge being electrically insulating.

20 Claims, 3 Drawing Sheets

(56) References Cited

U.S. PATENT DOCUMENTS

| | | | |
|---|---|---|---|
| 2011/0159340 A1 | 6/2011 | Hu et al. | |
| 2012/0129038 A1 | 5/2012 | Lim et al. | |
| 2013/0252063 A1* | 9/2013 | Park | H01M 2/14 429/120 |
| 2013/0288099 A1* | 10/2013 | Kim | H01M 2/1077 429/120 |
| 2014/0193685 A1 | 7/2014 | Lim | |
| 2015/0079428 A1 | 3/2015 | Kwon | |
| 2015/0303425 A1* | 10/2015 | Kong | H01M 2/1077 429/152 |

FOREIGN PATENT DOCUMENTS

| | | |
|---|---|---|
| DE | 10 2013 224 915 A1 | 6/2015 |
| EP | 2 472 633 A1 | 7/2012 |
| JP | 2014-107217 A | 6/2014 |
| WO | 2011/048916 A1 | 4/2011 |

OTHER PUBLICATIONS

French Preliminary Search Report for FR 1651299, dated Jun. 8, 2016.
"Standard Test Method for Rubber Property-Durometer Hardness", ASTM International, Designation D2240-15, Jan. 2016, pp. 1-13.

* cited by examiner

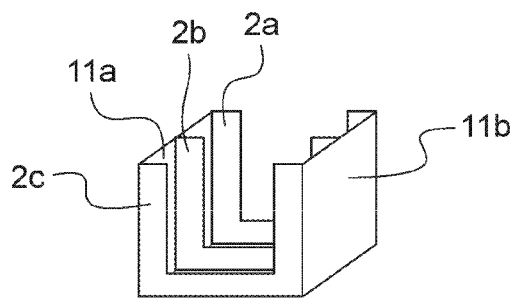
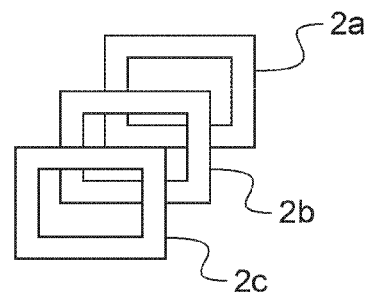
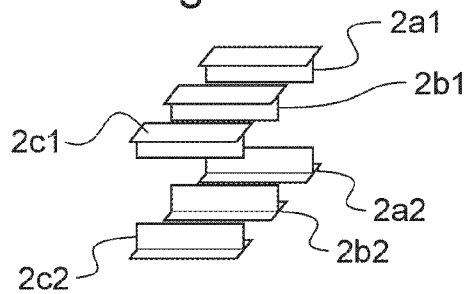
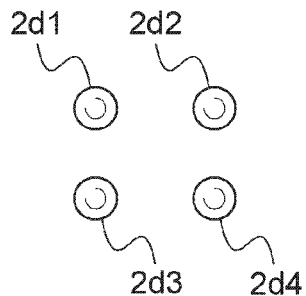
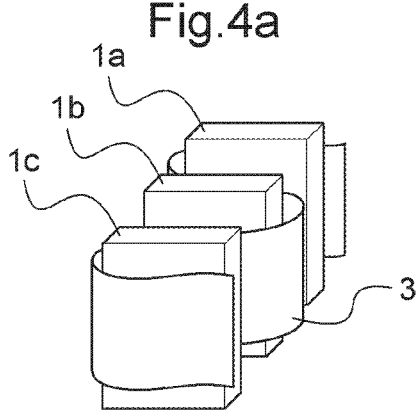
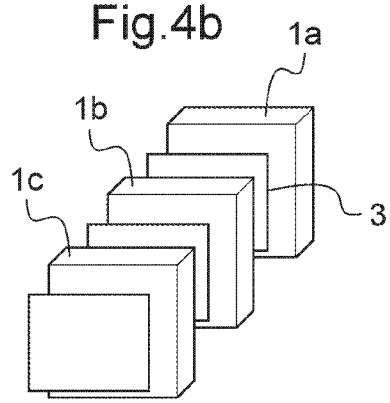
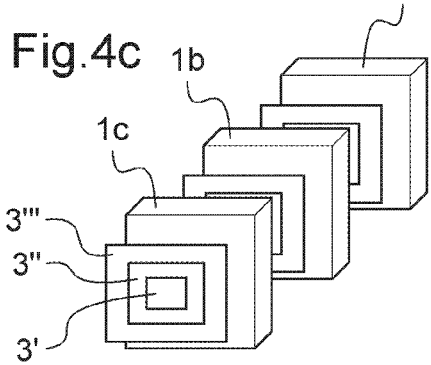

COMPENSATION SYSTEM FOR SWELLING OF ELECTROCHEMICAL CELLS

TECHNICAL FIELD

The invention relates to the technical field of compensation systems for the swelling of electrochemical cells constituting a battery.

PRIOR ART

A battery of electrochemical cells comprises a plurality of electrochemical cells, designated hereinbelow by the term "cell(s)", which are assembled side by side in a common grouping box. This box is intended to keep the cells in a fixed position during transport or use of the battery.

During charging of a sealed cell of lithium-ion type swelling of the container of the cell is evident. In the case of an cell of parallelepiped format (synonym for prismatic format), swelling occurs essentially on the two lateral planar opposite faces the biggest ones of the container. This swelling is amplified while the state of charge of the cell moves closer to the completely charged state. As the cells are joined behind each other in the grouping box and each cell experiences an increase in its thickness, a notable increase in the total length of the battery is seen, resulting from the sum of the increases in thicknesses of the cells. Because the grouping box is generally constituted by a rigid material and the free space between the cells and the walls of the box is limited, swelling of the cells subjects the walls of the box to pressure forces which may lead to its irreversible deformation, or even to its being damaged. As a consequence, a device which prevents the box from deforming under the effect of the swelling of the cells during their charge is preferred.

To rectify this problem it is known to insert a spring or a deformable piece between two faces of two cells. During charging, the increase in volume of the cells is compensated by the reduction in length of the spring or by the reduction in thickness of the deformable piece. Examples of material of the deformable piece are silicone or polyurethane or vinyl polychloride foams sold by the company Saint-Gobain under the brand NORSEAL®. However, this solution is not fully satisfactory since the use of foam gives the assembly of cells insufficient rigidity. Also, variation in the length of the assembly of cells is sometimes not fully eliminated. Finally, the compression force generated by the cells is not controlled. Neither is the use of a metal spring between two cells a satisfactory solution since it may result in a short-circuit, the container of the cells being generally metallic. Also, since the metal of the spring has good thermal conductivity, the latter rapidly spreads any increase in temperature from one cell to the next.

Documents describe systems for compensation of the swelling of cells of a battery. For example, document CN 201038203 describes a sealed prismatic cell of lithium-ion type placed in a rigid envelope. Grooves have been made on two lateral opposite faces of this envelope. It is said that the presence of these grooves reduces swelling of the cell, and therefore the risk of explosion.

Document JP 2014107217 describes an cell of overall prismatic format, in which two lateral opposite faces of the container of the cell exhibit bulging. This bulging is located near the center of each face. It is provided during manufacture of the container with a view to increasing the available volume for the electrochemical bundle. A resin wedge is placed between two adjacent electrochemical cells. This wedge has the particular feature of having variable thickness. The part of the wedge located in contact with the bulging has a thickness of less than that located at the ends of the wedge in contact with the periphery of a face of the cell. Because of this wedge of variable thickness, it is possible to maintain good contact between the wedge and the cell. But the solution described in this document applies to a container of cells having the shape of an out-of-round parallelepiped, though this cell format is not current.

There is therefore a need to provide a system which prevents variation in dimensions of the grouping box when the latter contains one or more sealed electrochemical cells.

SUMMARY OF THE INVENTION

To this effect, the invention proposes a battery comprising at least two electrochemical cells of prismatic format, wherein the electrochemical cells are separated by a rigid wedge having a hardness greater than or equal to 90 Shore A according to the standard ASTM D 2240 and by a flexible wedge having a hardness of up to 60 Shore A according to the standard ASTM D 2240, the rigid wedge and the flexible wedge being electrically insulating.

The rigid wedge and/or the flexible wedge may consist of electrically insulating material, or a first electrically conductive material covered with a second electrically insulating material. According to a preferred embodiment, the flexible wedge consists of plastic material or consists of a metal spring covered with an insulating material, such as plastic material.

According to a preferred embodiment, the flexible wedge comprises a material whereof the thermal conductivity is less than or equal to 0.5 W/(m·K), preferably ranging from 0.02 to 0.2 W/(m·K).

According to a preferred embodiment, the flexible wedge comprises several portions of different hardness. A first portion in contact near the center of a wall of the electrochemical cell may have a hardness less than that of a second portion in contact near the periphery of this wall of the electrochemical cell.

According to a preferred embodiment, the rigid wedge comprises a vertical part and a horizontal part, the vertical part being disposed against a vertical wall of an electrochemical cell and the horizontal part being disposed against a horizontal wall of this electrochemical cell. The horizontal part of the rigid wedge may comprise at least one orifice through which a current output terminal of the electrochemical cell is inserted.

The battery may comprise as many rigid wedges as electrochemical cells, the rigid wedges forming a single piece.

According to an embodiment, the battery comprises as many rigid wedges as electrochemical cells, the rigid wedges being separate from each other.

According to an embodiment, the rigid wedges have the shape of a rectangular frame.

According to an embodiment, the battery comprises as many rigid wedges as electrochemical cells, each wedge being formed by at least two separate sub-components.

The two separate sub-components may each be in a "T" shape, one being placed near the upper part of the electrochemical cell, the other being placed near the lower part of the electrochemical cell.

According to an embodiment, a rigid wedge comprises at least three separate sub-components, each sub-component having for example a circular shape.

According to an embodiment, the battery comprises a single flexible wedge common to all the electrochemical cells.

According to an embodiment, the battery comprises as many flexible wedges as electrochemical cells, the flexible wedges being separate from each other.

The electrochemical cells may be of lithium-ion type.

Another aim of the invention is a method for assembly of a battery comprising at least two electrochemical cells, said method comprising the steps of:

a) providing a first electrochemical cell of prismatic format, b) placing a rigid wedge having a hardness greater than or equal to 90 Shore A according to the standard ASTM D 2240 and a flexible wedge having a hardness of up to 60 Shore A according to the standard ASTM D 2240, against one of the faces of the first electrochemical cell, c) joining a second electrochemical cell of prismatic format against the rigid wedge and the flexible wedge.

According to an embodiment, prior to step c) for joining the second electrochemical cell, the flexible wedge has a thickness greater than that of the rigid wedge, and during step c) for joining the second electrochemical cell, the thickness of the flexible wedge reduces under the compression exerted by the second electrochemical cell.

DESCRIPTION OF THE FIGURES

FIGS. 3a to 3d illustrate different shapes and configurations of rigid wedges.

FIGS. 4a to 4c illustrate different shapes and configurations of flexible wedges.

DESCRIPTION OF EMBODIMENTS

During assembly of two prismatic cells the invention proposes inserting a rigid wedge and a flexible wedge between these cells, these two wedges being electrically insulating.

The function of the rigid wedge is to keep the distance between two adjacent cells constant, playing the role of a spacer. Rigid wedge means a wedge comprising material whereof the hardness is greater than or equal to 90 Shore A measured according to the standard ASTM D 2240. It may consist of thermoplastic, heat-setting material, an elastomer, a composite, a ceramic, a metal whereof the surface is coated with a varnish or whereof the surface has undergone treatment making it electrically insulating.

The function of the flexible wedge is to absorb the increase in thickness of the cell with which it is associated during charging of the cell. Flexible wedge means a wedge consisting of material having a hardness of up to 60 Shore A measured according to the standard ASTM D 2240. Material capable of exerting pressure ranging from 0.2 to 5 daN/cm$^2$ (20 to 500 kPa) is suitable also for making the flexible wedge. Material having a hardness from 0.25 to 1 daN/cm$^2$ (25 to 100 kPa) is preferably selected for deformation of 20% of its thickness.

The preferred material for the flexible wedge is plastic material; examples being foams and thermoplastic or heat-setting elastomers. Examples of commercially available materials are cellular silicone foams of brand ProtectION$^{+TM}$ SF50 and SF70 sold by Saint-Gobain, cellular polyurethane foam Korel® K20 sold by Saint-Gobain or cellular rubber of ethylene-propylene-diene monomer (EPDM) Celgummi 1722 sold by National Gummi. It is also possible to use a plastic spring or a metal spring covered with a layer of thermally insulating material in place of foam.

Preferably, material having thermal conductivity of less than 0.5 W/(m·K), preferably ranging from 0.02 to 0.2 W/(m·K), is selected. This thermally insulates the cell on which the wedge is installed and prevents heat generated by an cell functioning abnormally from spreading to the adjacent cells.

Figure 1A:
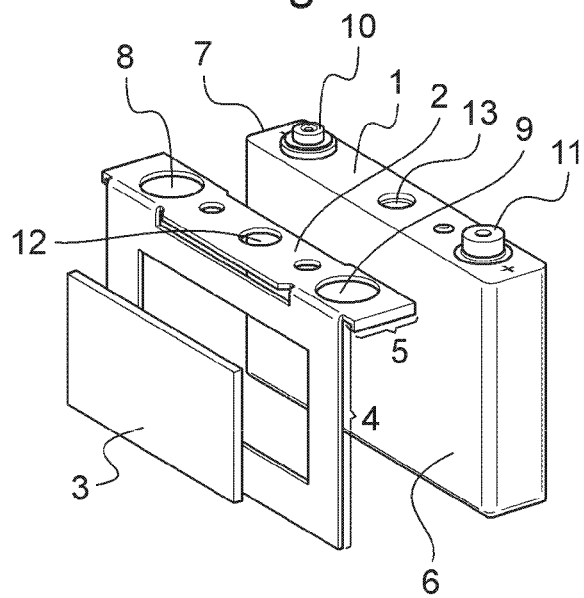
FIG. 1a illustrates a view of a prismatic cell, a rigid wedge and a flexible wedge prior to assembly.

FIG. 1a illustrates a prismatic cell (1), a rigid wedge (2) and a flexible wedge (3) prior to assembly. The rigid wedge (2) comprises a vertical part (4) and a horizontal part (5). The vertical part (4) is pressed against a vertical wall (6) of the prismatic cell and the horizontal part (5) rests on a horizontal wall (7) of this cell. The vertical part (4) has the shape of a rectangular frame whereof the height and the width are substantially identical to those of the cell with which the rigid wedge is associated. The flexible wedge (3) is housed in the space located in the rectangular frame. Preferably, the flexible wedge occupies the entire space located inside the frame.

The horizontal part (5) of the rigid wedge (2) may comprise at least one orifice (8, 9) through which a current output terminal (10, 11) of the cell is inserted. This orifice prevents displacement of the rigid wedge (2) on the cell (1). Preferably, the horizontal part comprises two orifices, one (8) intended to receive the negative current output terminal (10), the other (9) intended to receive the negative current output terminal (11). The two orifices may have different sections, which differentiates the placement of the positive terminal from that of the negative terminal. The horizontal part (5) may further comprise an orifice (12) coinciding with the placement of the orifice for electrolyte filling or with the placement of a safety valve (13).

Figure 1B:
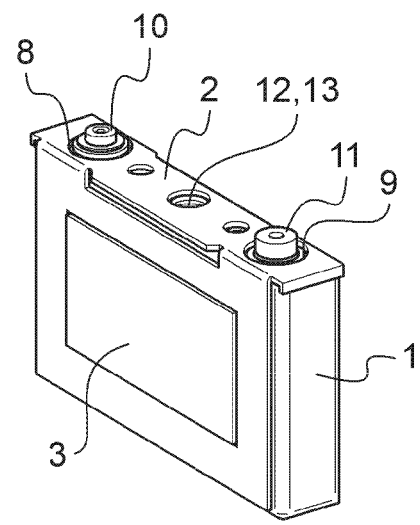
FIG. 1b illustrates a view of a prismatic cell assembled with a rigid wedge and a flexible wedge.

FIG. 1b illustrates a view of a prismatic cell (1) assembled with a rigid wedge (2) and a flexible wedge (3). The current output terminals (10, 11) pass through the orifices (8, 9). It should be noted that the invention is not limited to the fastening method of the rigid wedge described in FIGS. 1a and 1b. The rigid wedge could be fixed in any other way to the cell. The rigid wedge may simply be pressed against the vertical wall (6) of the cell without comprising a horizontal part (5). FIG. 3b shows three rigid frames devoid of a horizontal part.

In a preferred embodiment, the thickness of the cell is substantially constant over its entire height. Similarly, the thickness of the rigid wedge and the thickness of the flexible wedge are substantially constant over their entire height.

Figure 2A:
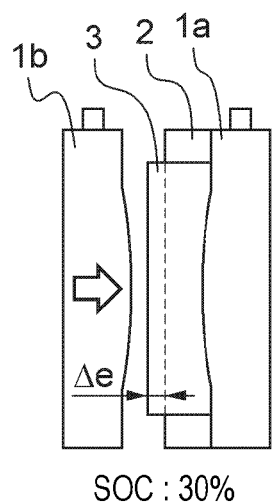
FIG. 2a illustrates a view in longitudinal section, during the assembly step, of two electrochemical cells between which a flexible wedge and a rigid wedge have been inserted.

FIG. 2a illustrates a view in longitudinal section of two cells (1a, 1b) between which a rigid wedge (2) and a flexible wedge (3) have been inserted. The thickness of the flexible wedge is in general greater than that of the rigid wedge so that during the assembly of the second cell (1b) on the first cell (1a), joining of the second cell (1b) to the rigid wedge (2) causes compression of the flexible wedge (3). During assembly, the flexible wedge (3) subjects the electrochemical cells (1a, 1b) to a compression force. This compression force is exerted due to the difference (4e) between the thickness of the rigid wedge and that of the flexible wedge, even in the absence of swelling of the cells. The compression force in the absence of swelling of the cells is called by the term "precompression" below. For a given hardness of the flexible wedge material, it is possible to have this precompression varied. The greater the difference 4e between the thickness of the rigid wedge and that of the flexible wedge, the greater the precompression is also. It is also possible for a difference in given thickness between the flexible wedge and the rigid wedge to increase precompression by boosting the hardness of the material of the flexible wedge. The skilled person may therefore vary the precompression of the cells by varying either the difference in thickness between the flexible wedge and the rigid wedge or the nature of the material of the flexible wedge. The existence of precompression avoids deformation of the electrodes of the electrochemical bundle of the cell. Flexible wedge material of hardness greater than around 90 Shore A would not deform enough, which could result in a considerable increase in the internal pressure of the cell. Preferably, the flexible wedge material has a hardness greater than 30 Shore OO according to the standard ASTM D 2240. The slight swelling visible on the two faces opposite each other of the two cells (1a, 1b) is explained by the fact that the cells are assembled while they are being partially charged. The value of the state of charge of 30% (SOC: 30%) is given in FIG. 2a by way of indication for prismatic cells of lithium-ion type.

Figure 2B:
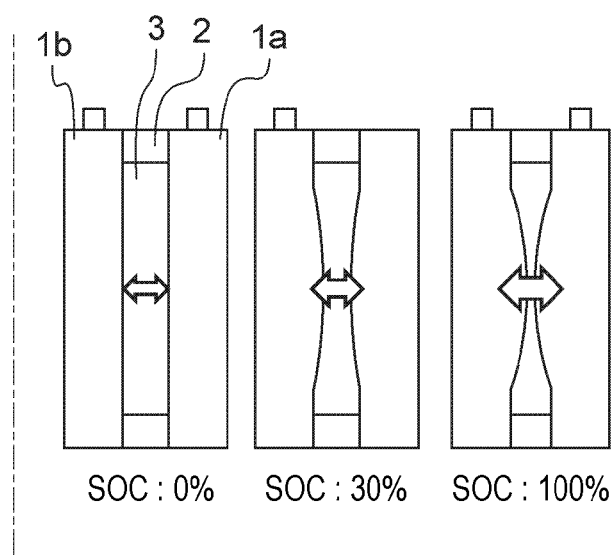
FIG. 2b illustrates a view in section of an assembly comprising two electrochemical cells between which a flexible wedge and a rigid wedge have been inserted; it illustrates the deformations which occur on electrochemical cells and on the flexible wedge for different states of charge of the cell.

FIG. 2b illustrates deformations which occur on the cells (1a, 1b) and on the flexible wedge (3) during charging of these cells. The left drawing shows that in the uncharged state (SOC=0%), the cells (1a, 1b) show no swelling. The flexible wedge is precompressed, however. During charging of the cells, swelling appears on the lateral walls of the cells. It assumes amplitude and is absorbed by the reduction in thickness of the flexible wedge as shown by the drawings corresponding to the states of charge of 30 and 100%. The flexible wedge exerts increasing pressure on the wall of the cell while the latter swells. The material of the flexible wedge may for example exert:
  pressure comprised between 0.2 and 1 daN/cm$^2$ for a fully uncharged cell;
  pressure comprised between 1 and 2 daN/cm$^2$ for an cell charged to 30%;
  pressure comprised between 2 and 5 daN/cm$^2$ for an cell charged to 100%;

The rigid wedge (2) is not deformed during charging and maintains a constant distance between the peripheral zones of the two cells (1a, 1b). Consequently, the total length of the cells placed in the grouping box is kept constant.

The rigid wedge may take different shapes and be arranged in different ways.

In a first variant shown in FIG. 3a, a single piece forms the rigid wedges. This piece comprises several parallel partitions (2a, 2b, 2c) joined together by two vertical plates (11a, 11b) fixed perpendicularly to each partition. This single piece may receive two cells (not shown in FIG. 3a).

In a second variant shown in FIG. 3b, the rigid wedges have a frame shape. Each cell is associated with a rigid wedge.

In a third variant, each rigid wedge is formed by several sub-components, for example 2, 3 or 4 sub-components.

As shown in FIG. 3c, the rigid wedge may consists of two sub-components (2a1, 2a2, 2b1, 2b2, 2c1, 2c2), each sub-component having for example the shape of a "T". A first sub-component (2a1, 2b1, 2c1) is disposed near the upper part of the cell. A second sub-component (2a2, 2b2, 2c2) is disposed near the lower part of the cell. The thickness of the vertical part of the "T" shape fixes the spread between two cells.

As shown in FIG. 3d, the rigid wedge may also consist of four sub-components (2d1, 2d2, 2d3, 2d4), each sub-component having the shape of a stud. The thickness of the stud determines the distance between two adjacent cells. The four sub-components are placed near the four corners of the cell.

The flexible wedge may take different shapes and be arranged in different ways.

In a first variant shown in FIG. 4a, a single piece (3) forms a flexible wedge common to several cells (1a, 1b, 1c). This piece is in the shape of a strip which forms a S-shape path around the cells.

In a second variant shown in FIG. 4b, each flexible wedge (3) has a rectangular shape and there is one flexible wedge per cell.

In a third variant shown in FIG. 4c, the flexible wedge (3) consists of several portions (3', 3", 3") in frame shape nesting in each other. These portions have different hardness as a function of their position relative to the cell. For example, it is advantageous to provide more flexible material for the portion of the flexible wedge in contact with the region located at the center of the face of the cell (3'), since it is this region of the cell which swells the most. A more rigid material may be provided for the portion of the flexible wedge in contact with the region located at the periphery of the face of the cell (3"), since it is this region of the cell which swells the least. This effect may be also achieved by using a flexible wedge constituted by a single piece made from material whereof the hardness decreases closer to the center of the face of the cell.

Figure 5:
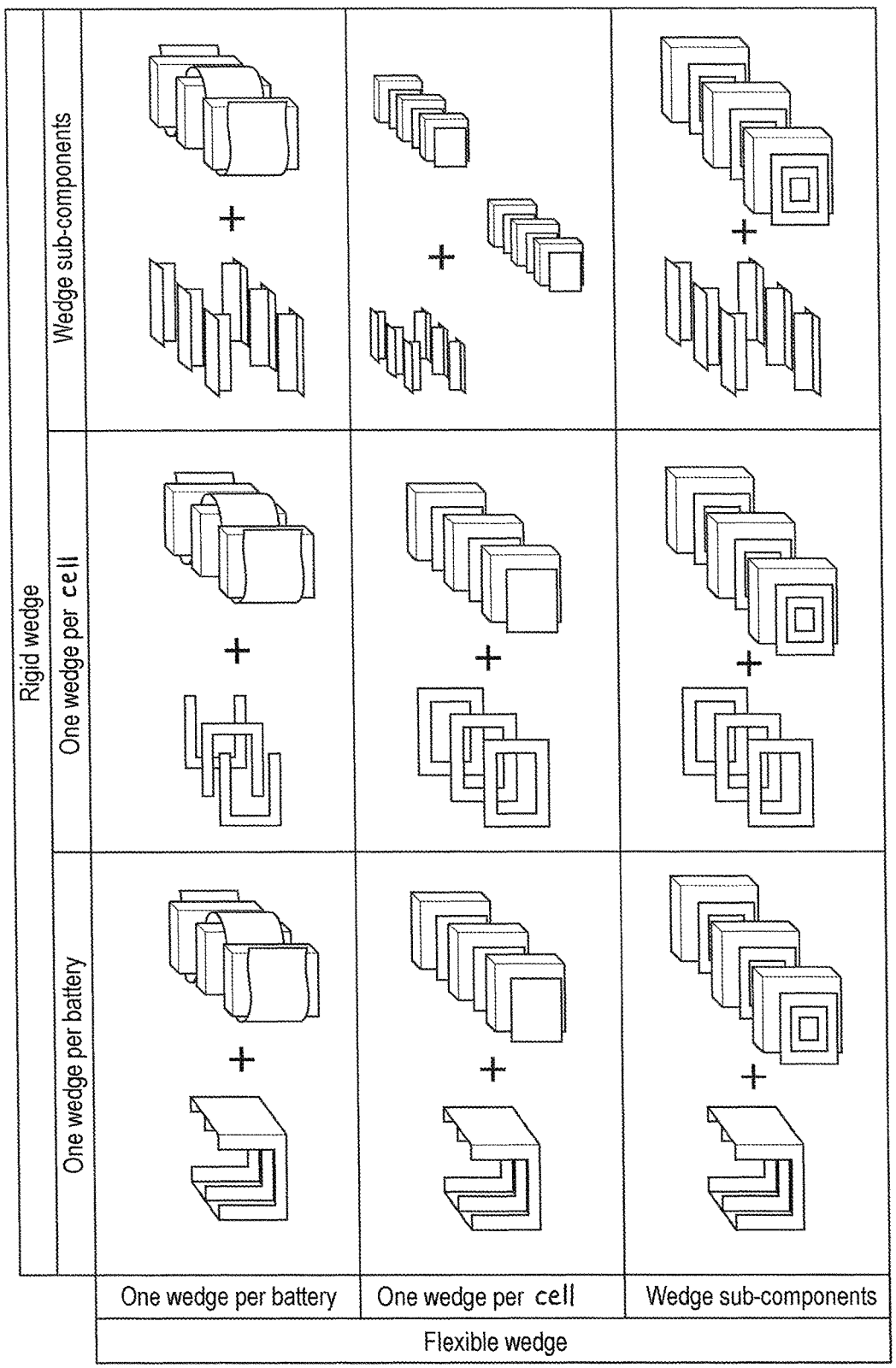
FIG. 5 illustrates different possibilities of combinations between the embodiments of a rigid wedge and those of a flexible wedge.

FIG. 5 illustrates the different possibilities of combinations between the different embodiments of the rigid wedge and those of the flexible wedge. The preferred embodiment is that in which a rigid wedge in frame shape is associated with a flexible wedge in rectangle shape (2$^{nd}$ column, 2$^{nd}$ line of the table of FIG. 5).

Another aim of the invention is a method for manufacturing a battery which uses the compensation system of the swelling of the cells, such as described above. This method may be used to make a battery comprising at least two cells, and comprising the following steps:
  a) providing a first cell of prismatic format (1a),
  b) placing a first rigid wedge (2) having a hardness greater than or equal to 90 Shore A according to the standard ASTM D 2240 and a first flexible wedge (3) having a hardness of up to 60 Shore A according to the standard ASTM D 2240 against one of the faces of the first cell (6),
  c) joining a second cell of prismatic format (1b) against the first rigid wedge and the first flexible wedge, The first flexible wedge (3) generally has a thickness greater than that of the first rigid wedge (2), and during step c) for joining the second cell (1b), the thickness of the first flexible wedge reduces under compression exerted by the second cell.

In an embodiment, the method further comprises a step d) for placing a second rigid wedge having a hardness greater than or equal to 90 Shore A according to the standard ASTM D 2240 and a second flexible wedge having a hardness of up to 60 Shore A according to the standard ASTM D 2240, against one of the faces of the second cell. According to a variant of this embodiment, steps c) and d) are reversed, i.e., the cells are first fitted with flexible and rigid wedges before being joined together.

It is understood that this manufacturing method is not limited to the assembly of two cells in a grouping box but that it may be used irrespective of the number of cells present in the box.

In an embodiment, the assembly comprises as many rigid wedges and flexible wedges as cells.

In a preferred embodiment, for a given number n of cells, the assembly comprises n+1 assemblies of flexible wedges and rigid wedges, i.e., each cell is fitted with a flexible wedge and a rigid wedge, except for one of the two cells located at the end of the assembly, which comprises a flexible wedge and a rigid wedge on two opposite faces.

The cells may be assembled in the grouping box according to an orientation for which all the current output terminals of the same polarity are according to the same line. But they may also be assembled according to an orientation for which an alternating configuration of current terminals of opposite polarities is arranged according to the same line.

The invention resolves the problem of the swelling of prismatic electrochemical cells when they are assembled side by side, and retains the thermal isolation between cells. Compression of electrodes, necessary for preserving the strength of the active material of the electrodes is ensured, however.

Another advantage of the invention is that it enables manufacture of a battery whereof the length is constant over time.

Finally, an advantage of the invention is facilitating integration of other components in the battery, such as the power connections between the electrical terminals.

The invention has been described above in reference to electrochemical cells of prismatic shape, but the skilled person could possibly apply them to cells of cylindrical format by using flexible and rigid wedges of cylindrical format.

The invention claimed is:

1. A battery comprising at least two electrochemical cells of prismatic format, wherein the electrochemical cells are separated by a rigid wedge having a hardness greater than or equal to 90 Shore A according to the standard ASTM D 2240 and by a flexible wedge having a hardness of up to 60 Shore A according to the standard ASTM D 2240, the rigid wedge and the flexible wedge being electrically insulating, wherein the flexible wedge comprises a material whereof the thermal conductivity is less than or equal to 0.5 W/(m·K), and wherein a thickness of the rigid wedge and a thickness of the flexible wedge are substantially constant over their entire height, and the flexible wedge has a thickness before joining the at least two electrochemical cells which is greater than the thickness of the rigid wedge, and after joining the second electrochemical cell, the thickness of the flexible wedge is reduced under the compression exerted by the second electrochemical cell.

2. The battery according to claim 1, wherein the rigid wedge and/or the flexible wedge consist(s) of either electrically insulating material, or a first electrically conductive material covered with a second electrically insulating material.

3. The battery according to claim 2, wherein the flexible wedge consists of plastic material or consists of a metal spring covered with an insulating material, such as plastic material.

4. The battery according to claim 1, wherein the flexible wedge comprises several portions of different hardness.

5. The battery according to claim 4, wherein a first portion in contact near the center of a wall of the electrochemical cell has a hardness less than that of a second portion in contact near the periphery of this wall of the electrochemical cell.

6. The battery according to claim 1, wherein the rigid wedge comprises a vertical part and a horizontal part, the vertical part being disposed against a vertical wall of an electrochemical cell and the horizontal part being disposed against a horizontal wall of this electrochemical cell.

7. The battery according to claim 6, wherein the horizontal part of the rigid wedge comprises at least one orifice through which a current output terminal of the electrochemical cell is inserted.

8. The battery according to claim 1, comprising as many rigid wedges as electrochemical cells, the rigid wedges forming a single piece.

9. The battery according to claim 1, comprising as many rigid wedges as electrochemical cells, the rigid wedges being separate from each other.

10. The battery according to claim 9, wherein the rigid wedges have the shape of a rectangular frame.

11. The battery according to claim 1, comprising as many rigid wedges as electrochemical cells, each wedge being formed by at least two separate sub-components.

12. The battery according to claim 11, wherein the two separate sub-components are each in a "T" shape, one being disposed near the upper part of the electrochemical cell, the other being disposed near the lower part of the electrochemical cell.

13. The battery according to claim 11, wherein a rigid wedge comprises at least three separate subcomponents, each sub-component having for example a circular shape.

14. The battery according to claim 1, comprising a single flexible wedge common to all the electrochemical cells.

15. The battery according to claim 1, comprising as many flexible wedges as electrochemical cells, the flexible wedges being separate from each other.

16. The battery according to claim 1, wherein the electrochemical cells are of lithium-ion type.

17. A method for assembly of a battery comprising at least two electrochemical cells, said method comprising the steps of:
a) providing a first electrochemical cell of prismatic format,
b) placing a rigid wedge having a hardness greater than or equal to 90 Shore A according to the standard ASTM D 2240 and a flexible wedge having a hardness of up to 60 Shore A according to the standard ASTM D 2240, against one of the faces of the first electrochemical cell, wherein the flexible wedge comprises a material whereof the thermal conductivity is less than or equal to 0.5 W/(m·K) and wherein a thickness of the rigid wedge and a thickness of the flexible wedge are substantially constant over their entire height,
c) joining a second electrochemical cell of prismatic format against the rigid wedge and the flexible wedge, wherein prior to step c) for joining the second electrochemical cell, the flexible wedge has a thickness greater than the thickness of the rigid wedge, and during step c) for joining the second electrochemical cell, the thickness of the flexible wedge reduces under the compression exerted by the second electrochemical cell.

18. The battery of claim 1, wherein the thickness of the rigid wedge and the thickness of the flexible wedge are constant over their entire height.

19. The battery of claim 1, wherein the rigid wedge contacts the at least two electrochemical cells over its entire height and the flexible wedge contacts the at least two electrochemical cells over its entire height.

20. The battery according to claim 1, wherein the flexible wedge comprises a material whereof the thermal conductivity ranges from 0.02 to 0.2 W/(m·K).

* * * * *